(12) United States Patent
Engler et al.

(10) Patent No.: US 9,511,657 B2
(45) Date of Patent: Dec. 6, 2016

(54) REPLACEABLE BATTERY MODULE FOR AN ELECTRIC VEHICLE

(75) Inventors: Friedhelm Engler, Hochheim (DE);
Clarence Kim, Wiesbaden (DE);
Richard Shaw, Koengernheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 782 days.

(21) Appl. No.: 13/605,235

(22) Filed: Sep. 6, 2012

(65) Prior Publication Data

US 2013/0062939 A1 Mar. 14, 2013

(30) Foreign Application Priority Data

Sep. 8, 2011 (DE) .................. 10 2011 112 572

(51) Int. Cl.
| | |
|---|---|
| *B60L 1/00* | (2006.01) |
| *B60L 3/00* | (2006.01) |
| *H02G 3/00* | (2006.01) |
| *B60K 1/04* | (2006.01) |

(52) U.S. Cl.
CPC ......... *B60K 1/04* (2013.01); *B60K 2001/0438* (2013.01); *B60K 2001/0472* (2013.01); *Y02T 90/124* (2013.01)

(58) Field of Classification Search
CPC .............. B60K 1/04; B60K 2001/0472; B60K 2001/0438; Y02T 90/124; Y02T 10/7005; Y02T 90/14; Y02T 10/7072; Y02T 10/7077; Y02T 10/7241; Y02T 10/7066; Y02T 10/7216; Y02T 90/127; Y02T 10/7044; Y02T 10/645; Y02T 90/121; Y02T 10/6217; Y02T 10/7022; Y02T 90/128

USPC ........................................................ 307/10.1
See application file for complete search history.

(56) References Cited

U.S. PATENT DOCUMENTS

| | | | | |
|---|---|---|---|---|
| 4,058,182 A | * | 11/1977 | Huber | ..................... B60K 1/04 105/50 |
| 4,339,015 A | * | 7/1982 | Fowkes | ..................... B60K 1/04 105/51 |
| 5,390,754 A | | 2/1995 | Masuyama et al. | |
| 5,918,692 A | | 7/1999 | Sekita et al. | |
| 5,921,578 A | | 7/1999 | Sekita et al. | |
| 6,227,322 B1 | * | 5/2001 | Nishikawa | ............. B60R 16/04 180/65.1 |
| 7,614,473 B2 | | 11/2009 | Ono et al. | |
| 7,886,861 B2 | * | 2/2011 | Nozaki | .................... B60K 1/00 180/232 |
| 7,913,788 B1 | | 3/2011 | Bryer et al. | |

(Continued)

FOREIGN PATENT DOCUMENTS

| | | |
|---|---|---|
| EP | 0779668 A1 | 6/1997 |
| WO | 2009077548 A1 | 6/2009 |

OTHER PUBLICATIONS

Great Britain Patent Office, Great Britain Search Report for Great Britain Application No. 1215038.9, dated Dec. 20, 2012.

(Continued)

*Primary Examiner* — Jung Kim
*Assistant Examiner* — Esayas Yeshaw
(74) *Attorney, Agent, or Firm* — Lorenz & Kopf LLP

(57) ABSTRACT

The present invention relates to a replaceable battery module for an electrically driven vehicle, with at least one bracket that can be detachably arranged on a bearing structure of the motor vehicle, and carries at least one battery unit.

11 Claims, 2 Drawing Sheets

(56) References Cited

U.S. PATENT DOCUMENTS

| | | |
|---|---|---|
| 9,033,084 B2 | 5/2015 | Joye |
| 2004/0035617 A1* | 2/2004 | Chaney .................... B60K 1/04 180/65.1 |
| 2009/0145676 A1* | 6/2009 | Takasaki .................. B60K 1/04 180/65.1 |
| 2010/0071979 A1* | 3/2010 | Heichal .................... B60K 1/04 180/68.5 |
| 2010/0175940 A1* | 7/2010 | Taneda ..................... B60K 1/04 180/68.5 |
| 2012/0121959 A1 | 5/2012 | Yamada |
| 2012/0161429 A1 | 6/2012 | Rawlinson et al. |

OTHER PUBLICATIONS

German Patent Office, German Search Report for Application No. 102011112572.1, dated Jun. 19, 2012.

\* cited by examiner

REPLACEABLE BATTERY MODULE FOR AN ELECTRIC VEHICLE

CROSS-REFERENCE TO RELATED APPLICATION

This application claims priority to German Patent Application No. 10 2011 112 572.1, filed Sep. 8, 2011, which is incorporated herein by reference in its entirety.

TECHNICAL FIELD

The technical field relates to a replaceable battery module for an electrically driven vehicle, as well as to an electric vehicle equipped with a corresponding battery module.

BACKGROUND

Electromobility is becoming increasingly important against the backdrop of finite and, if anything, dwindling deposits of fuel and combustibles worldwide. While sufficiently powerful electric engines are already available for a wide range of applications, problems still remain with storing and carrying along electrical energy.

All storage devices for directly storing electrical energy share in common that carrying along batteries or accumulators, for example, adds significantly to the overall weight of a vehicle. In addition, charging a vehicle battery provided for feeding an electric drive or a battery module exhibiting several battery units takes an unreasonably long time by comparison to filling a gas tank. Enough stowage space must also be provided in or on the motor vehicle for the battery module to be carried along, which sometimes requires that extensive work be performed with respect to the vehicle structure and installation space partitioning, as well as that modifications be introduced in terms of distributing the weight and shifting the center of gravity of the vehicle.

By contrast, at least one object herein is to shorten the time for which the motor vehicle must normally stand idle in order to charge the battery module, and in so doing simultaneously improve how the battery module is accommodated on the motor vehicle in terms of weight and center of gravity distribution. In addition, other objects, desirable features and characteristics will become apparent from the subsequent summary and detailed description, and the appended claims, taken in conjunction with the accompanying drawings and this background.

SUMMARY

In accordance with an exemplary embodiment, a replaceable battery module is provided for an electrically driven motor vehicle. The replaceable batter module exhibits at least one bracket that can be detachably arranged on a bearing structure of the vehicle, and carries at least one rechargeable battery unit. The bracket is preferably designed to accommodate several, or even all, battery units to be carried along on the vehicle, so that replacing the battery module with an already charged battery module makes it possible to tangibly reduce the time for which the motor vehicle stands idle.

For example, the motor vehicle can again be restored to an original state offering the maximum vehicle cruising range within the shortest possible time by changing out a battery module at a service station, in this case in particular by installing a structurally identical, charged battery module.

Because all battery units are bundled to at least one, and, to improve operability, potentially several replaceable battery modules, discharged and charged battery modules can be removed and installed so as to markedly shorten at least the time for which the motor vehicle stands idle.

In an embodiment, the bracket here exhibits at least one mounting plate, on or atop which at least one battery unit is detachably arranged. The detachable arrangement of one or more battery units on the mounting plate further makes it possible to remove or possibly replace individual battery units, for example for maintenance purposes. It can here be provided in particular that the bracket or mounting plate provide a standardized fastening concept for both the at least one battery and its own detachable arrangement on the bearing structure of the motor vehicle. As a consequence, both battery units of individual battery modules and battery modules themselves can be universally changed out, regardless of vehicle, platform or even manufacturer.

In another embodiment, the bracket also exhibits at least one fastening element, which corresponds with a counter-fastening element of the motor vehicle provided on the bearing structure. For example, one or more holding fixtures preferably distributed over the surface of the mounting plate can be provided on the bearing structure or body of the motor vehicle, which act as a fastening element, and can be used to accommodate individual fastening elements of the bracket.

A wide variety of fastening concepts can here be used. For example, the counter-fastening means on the bearing structure can exhibit a threaded borehole for accommodating a fastening element designed as a screw or bolt. Use can preferably also be made of positive and/or frictional fastening concepts, including in particular quick fastening or snap closing concepts, which make it possible to quickly release and secure fastening elements and counter-fastening elements while installing and removing the battery module on the bearing structure of the motor vehicle.

In a further embodiment, a lower side of the mounting plate of the bracket for the battery module facing away from the at least one battery unit is configured as a floor cladding section of the motor vehicle, or acts as one once installed on the motor vehicle.

It is here provided in particular that the battery module can be fastened to the floor structure of the motor vehicle, wherein the battery module is assembled or disassembled from the motor vehicle floor. In order to change out the battery module, the visible exterior cladding of the motor vehicle is in this regard not to be provided with any openings, or detachable parts for purposes of replacing the battery module. As a result, the appearance and design of the motor vehicle remain largely unaffected by the replaceable battery module provided here.

In addition, in an exemplary embodiment the mounting plate, in particular the lower side of the mounting plate facing away from the battery unit, is integrated essentially flush in an adjacent floor cladding of the motor vehicle with the battery module in a mounting position on the motor vehicle. The mounting plate is preferably largely closed, and can here provide a hermetic separation between the interior and exterior of the motor vehicle. It is advantageously also provided that at least one sealing element be arranged on an outer edge or along an outer border of the mounting plate, which can be used to tightly secure the mounting plate or battery module in a recess in the adjacent floor cladding of the motor vehicle provided in the floor for this purpose.

The battery module can also be sealed or hermetically separated relative to the vehicle interior, in particular for purposes of passenger protection. In particular, all battery units provided on the battery module can be largely hermetically encapsulated from the environment, whether individually and separately or together.

Another embodiment also provides that the at least one fastening element and/or the correspondingly designed counter-fastening elements that interact with the latter prescribe a direction for assembling and disassembling the battery module that is essentially aligned in the vertical direction of the vehicle (z). In this regard, the battery module can be lowered and oppositely raised in the vertical direction of the vehicle (z), so as to detach it from the bearing structure of the motor vehicle and again refasten it thereto.

Independently of the respective fastening concept, in another embodiment at least one electrical connecting means is provided or formed on the bracket and/or at least one battery unit, and corresponds with an electrical connecting element provided on the vehicle. Proceeding in this way makes it possible to almost automatically electrically connect the electrical connecting means on the battery module with electrical connecting elements on the vehicle corresponding thereto once a final assembly position for the battery module on the motor vehicle has been reached.

As a consequence, separate electrical contacting or electrical decoupling need not be performed while assembling or disassembling the battery module on the motor vehicle. The electrical connecting elements on the battery module and motor vehicle are positioned in such a way that the electrical contacts establish electrical contact with each other once a final assembly position for the battery module on the motor vehicle has been reached at the latest.

In another embodiment, a motor vehicle is further provided with at least one electrical drive and with at least one battery module designated above that can be detachably arranged on the bearing structure, in particular on the floor of the motor vehicle. The motor vehicle can here be equipped like a purely electrically operated motor vehicle, but also as a hybrid vehicle with an electrical auxiliary drive. The vehicle can here exhibit at least one, but also several battery modules arranged separately from each other, which can each exhibit one or even several battery units.

In particular, the battery module size depends on the overall weight of the battery module and the electrical energy it is to provide. Its weight should enable a manual replacement, which can also take place by means of hydraulic or other power-assisted hoisting and supporting equipment.

An exemplary embodiment here provides in particular that the battery module be detachably arranged in roughly the center of the bearing structure of the motor vehicle in relation to the transverse direction of the vehicle (y). A central positioning proves advantageous in terms of the weight distribution and center of gravity of the motor vehicle.

In relation to the longitudinal direction of the vehicle (x), another embodiment provides that the battery module be detachably arranged in a region lying between the front axis of the motor vehicle and the front seat. Depending on the size and geometric configuration of the front vehicle seat and battery module, it can here also be provided that the battery module even projects into the front axis or front wheel region and/or also into the foot or leg area of the front seats in relation to the longitudinal direction of the vehicle (x).

Another embodiment provides that the battery module, in relation to the vertical direction of the vehicle (z), be detachably arranged underneath a passenger cabin, and hence largely underneath the front vehicle seat and/or underneath a front axis of the motor vehicle. Such a deep arrangement of the battery module helps to achieve the deepest positioning or displacement possible for the center of gravity of the vehicle. In addition, an arrangement in front of or regionally underneath the front motor vehicle seat makes it possible to configure the center of gravity or dynamic characteristics of the motor vehicle largely independent of the constitution, in particular of the weight of the vehicle passenger(s).

By having the battery module situated directly adjacent to the front or driver's seat of the motor vehicle, the motor vehicle dynamics will largely behave invariantly in relation to how many items or passengers the motor vehicle is carrying.

In another embodiment, the electric drive of the motor vehicle as viewed in the traveling direction or vehicle longitudinal direction (x) of the vehicle is situated behind a front vehicle seat or behind the driver's seat. Any back seat that might be present can come to lie behind the electric drive in relation to the traveling direction of the motor vehicle. In this regard, the drive can be arranged between the front and back seat.

The above notwithstanding, the vehicle can further offer an electric mid-mounted engine concept. Similarly to the battery module, the engine is here also located underneath the passenger cabin or underneath a floor section of the passenger cabin lying between the front seat and back seat.

In an exemplary embodiment, the front seat is situated behind the battery module and in front of the drive as viewed in the longitudinal direction of the vehicle or traveling direction (x). This enables a comparatively deep arrangement of the front or driver's seat, so that the overall design height of the motor vehicle can be kept comparatively low, especially for optimizing its aerodynamics.

Another embodiment provides the vehicle with a hoisting and/or lowering device, which can be used to lower and/or hoist the battery module as required for replacement purposes. The power required for operating the hoisting and/or lowering device equipped with an electric motor can be provided either by a second battery module, or via a separate electrical connection independent of the installed condition.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
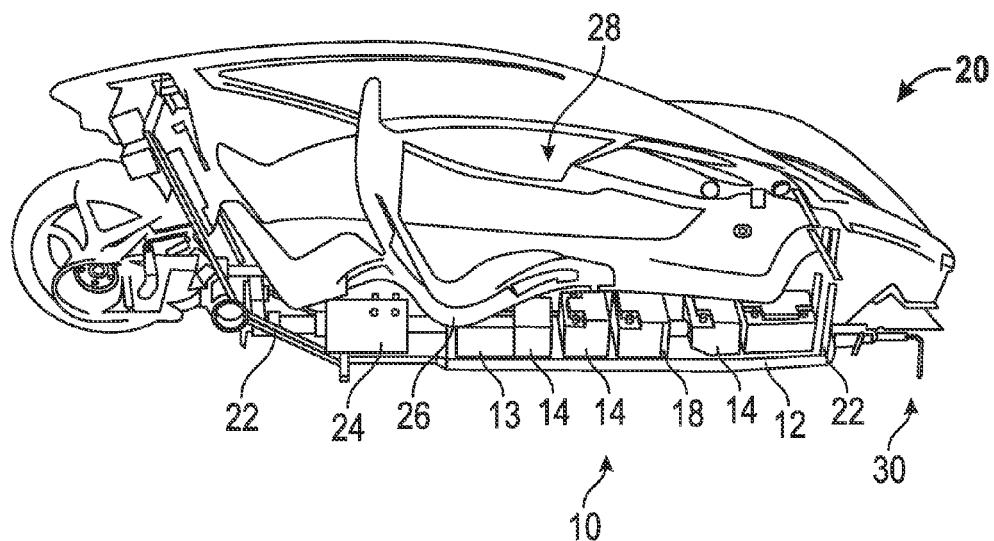
FIG. 1 is a partially cut side view of the electrically driven motor vehicle furnished with a replaceable battery module in accordance with an exemplary embodiment.
Figure 2:
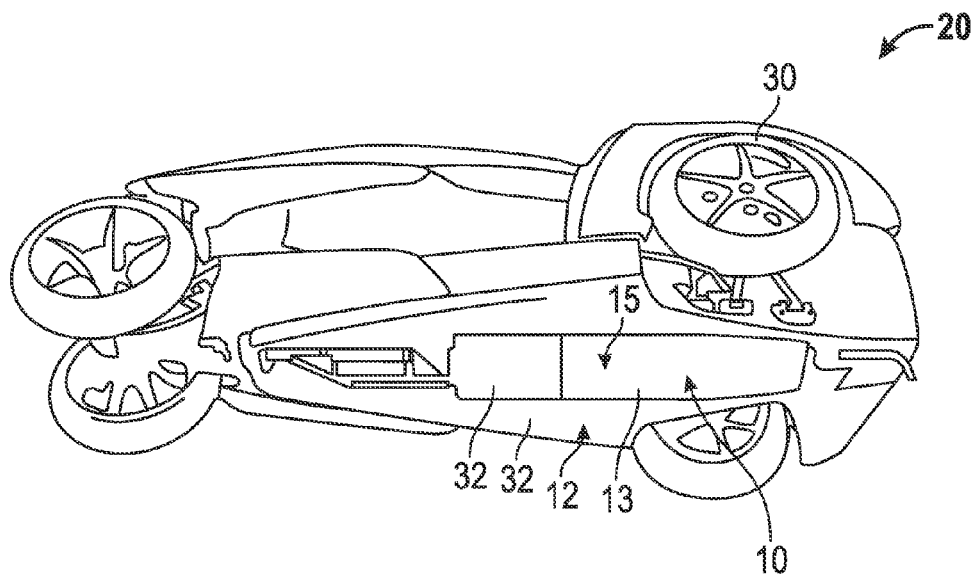
FIG. 2 is a perspective view of the bottom side of the motor vehicle with a battery module arranged thereupon in accordance with an exemplary embodiment.
Figure 3:
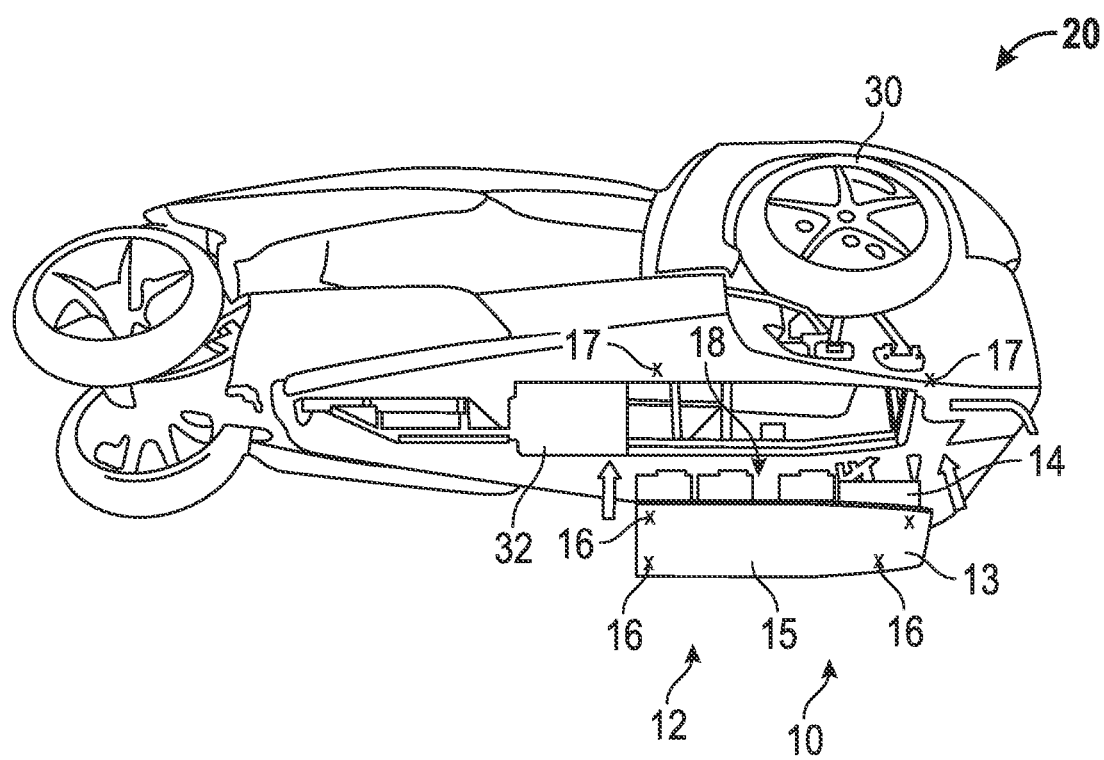
FIG. 3 is a view comparable to FIG. 2 with the battery module detached or disassembled.

The electric vehicle 20 depicted on FIG. 1 to 3 in varying configurations exhibits a bearing structure 22, for example one designed like a grid frame. A battery module 10 detachably arranged on the floor of the bearing structure 22 adjoins or projects into a front wheel region 30. It has a bracket 12 with a mounting plate 13, upon which several battery units 14 are situated on the upper side facing the motor vehicle interior.

While the present exemplary embodiment exhibits several individual battery units 14, for example electrically connected in series or parallel, it is possible in other configurations and embodiments to also provide just a single battery unit with correspondingly large dimensions, which can be detachably arranged on the bottom side of the bearing structure 22 by means of the bracket 12.

In order to detachably secure the battery module 10, in particular its bracket 12 or mounting plate 13, several fastening elements 16 distributed over the surface of the mounting plate 13 can preferably be provided on the bracket 12 and mounting plate 13, for example in the form of screws or bolts, which attach the battery module 10 to the bearing structure 22 by interacting with counter-fastening elements corresponding thereto, for example threaded boreholes 17.

The bracket 12 or at least one of the battery units 14 further exhibits an electrical plug connector 18, with which an electrical contact can be established between the battery module 14 and the drive 24 situated on the vehicle. The electrical contact can here be established largely automatically or corresponding to the mechanical attachment of the battery module 10 to the bearing structure 22 of the motor vehicle. The electrical contacting is designed in such a way relative to the vehicle and battery module that electrical contact can be achieved once a final assembly configuration of the battery module 10 on the bearing structure 22 of the motor vehicle 20 has been reached.

Depending on the configuration of the electrical contacting and number of battery units 14 to be provided on the bracket 12, the bracket 12 can be used to establish electrical contact between individual battery units 14, as well as contact with the drive 24. However, electrical contact with the at least one battery unit 14 can also be established independently hereof, for example by arranging contact elements 18 provided on the vehicle in standardized, prescribed positions relative to the battery module bracket 12 on the bearing structure of the motor vehicle 20 in such a way as to establish electrical contact between the drive 24 and battery module 10 at the latest with the assembly of the battery module 10 to the bearing structure 22.

The motor vehicle shown in varying depictions and configurations on FIGS. 1 to 3 exhibits a shell-like front or driver's seat 26, whose seating surface viewed in the longitudinal direction of the vehicle lies above and overlaps an area of the battery module 10 situated toward the rear in the traveling direction. In addition, the front seat 26 is located roughly between an electromotive drive 24 and the battery module 10 arranged on the floor relative to the longitudinal direction of the vehicle (x). Because the battery module 10 is at least regionally located in front of the front seat in relation to the traveling direction, but the drive 24 also provided underneath the passenger cabin 28 is located behind the front seat 26, a comparatively deep positioning can be achieved for the front seat 26.

According to the depiction on FIG. 1, the shell-like front seat 26 here even allows the driver to be in nearly a recumbent seated position, wherein the leg area of the driver comes to lie mostly above the battery module 10.

The bracket 12 along with the mounting plate 13 lying underneath is also designed as a floor cladding part for the motor vehicle. As shown on FIG. 2, the bottom side 15 of the mounting plate 13 can be arranged largely flush and tight relative to the adjoining floor cladding 32. In this respect, the battery module 10 provides a simultaneous hermetic separation between the inner and outer area of the motor vehicle 20.

As further evident from FIG. 1, the battery module 10 is located in the front region of the motor vehicle, and can here come to project into a front wheel area 30 as viewed in both the longitudinal (x) and vertical (z) directions of the vehicle. Arranging the battery module 10 close to the axis is advantageous with respect to the dynamic characteristics of the motor vehicle, as well as for achieving the most favorable center of gravity.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A replaceable battery module for an electrically driven vehicle having a vehicle frame supporting a seat and an electromotive drive, the replaceable battery module comprising:
   a mounting plate carrying a battery unit on a first side of the plate;
   a bracket configured to be detachably secured to a bearing structure on the vehicle frame for securing the battery unit between the mounting plate, the bracket and the bearing structure and locating the front seat between the battery unit and the electromotive drive; and
   a plurality of threaded fasteners extending through the mounting plate and the bracket for detachably securing the bracket to a plurality of corresponding provided on the bearing structure;
   wherein the replaceable battery module is hermetically separated from an interior of the vehicle.

2. The replaceable battery module according to claim 1, wherein the at least one plurality of threaded fasteners and/or the plurality of threaded boreholes prescribe an assembly or disassembly direction that is essentially aligned in a vertical direction of the electrically driven vehicle.

3. The replaceable battery module according to claim 1, wherein a lower side of the mounting plate facing away from the battery unit is designed as a floor cladding section of the electrically driven vehicle.

4. The replaceable battery module according to claim 1, wherein the mounting plate is integrated essentially flush in a floor cladding of the electrically driven vehicle when the replaceable battery module is in a mounting position on the electrically driven vehicle.

5. The replaceable battery module according to claim 1, wherein at least one electrical connecting element is provided on the bracket and/or on the battery unit, and corresponds with an electrical connecting element formed on the electrically driven vehicle.

6. The replaceable battery module according to claim 1, wherein the replaceable battery module is configured to be centrally located in relation to a transverse direction of the motor vehicle.

7. The replaceable battery module according to claim 1, wherein the replaceable battery module further comprises at least one battery unit hermetically encapsulated from the environment.

8. A motor vehicle comprising:
- a vehicle frame having a floor and a bearing structure including a plurality of threaded boreholes;
- a seat supported on the vehicle a above the floor in an interior of the motor vehicle;
- an electric drive supported on the frame behind the seat; and
- at least one replaceable battery module arranged on the floor of the motor vehicle and hermetically separated from the vehicle interior, the at least one replaceable battery module including:
  - a mounting plate carrying at least one battery unit on a first side of the plate;
  - a bracket detachably secured to the vehicle frame for securing the battery unit between the mounting plate, the bracket and the bearing structure and locating the front seat between the battery unit and the electromotive drive;
  - a plurality of threaded fasteners extending through the bracket and into corresponding plurality of threaded boreholes for detachably securing the bracket to the bearing structure.

9. The motor vehicle according to claim 8, wherein the at least one replaceable battery module is centrally located in relation to a transverse direction of the motor vehicle.

10. The motor vehicle according to claim 8, wherein the at least one replaceable battery module is detachably arranged so as to project underneath a passenger cabin and/or into a region of a front wheel in relation to a vertical direction of the motor vehicle.

11. The motor vehicle according to claim 8, wherein the replaceable battery module further comprises at least one battery unit hermetically encapsulated from the environment.

* * * * *